United States Patent [19]
Gerrish, Sr. et al.

[11] 3,879,373
[45] Apr. 22, 1975

[54] CONCENTRATION AND ISOLATION OF PENTOSANS FROM WHEAT BRAN

[75] Inventors: Oliver B. Gerrish, Sr.; Ganta V. Rao, both of Hutchinson, Kans.

[73] Assignee: Far-Mar-Co., Inc., Hutchison, Kans.

[22] Filed: Oct. 5, 1972

[21] Appl. No.: 295,192

[52] U.S. Cl. .......................... 260/209 R; 260/209 R
[51] Int. Cl. .............................................. C13k 9/00
[58] Field of Search ................................ 260/209 R

[56] References Cited
UNITED STATES PATENTS

| | | | |
|---|---|---|---|
| 3,282,869 | 11/1966 | Bryner | 260/209 R |
| 3,687,807 | 8/1972 | Stranger-Johannessen | 260/209 R |

OTHER PUBLICATIONS

Kudo, "Chem. Abst.," Vol. 73, 1970, p. 52371y.

*Primary Examiner*—Johnnie R. Brown
*Attorney, Agent, or Firm*—Clarence A. O'Brien; Harvey B. Jacobson

[57] ABSTRACT

Pentosans may be isolated from wheat bran according to a process by which the bran is delignified, water soluble matter extracted therefrom and the pentosans separated by extraction from a frozen delignified branalkali solution. The pentosans are recovered following thawing, by neutralization and acetone precipitation and are purified by copper complexing.

19 Claims, No Drawings

CONCENTRATION AND ISOLATION OF PENTOSANS FROM WHEAT BRAN

BACKGROUND OF THE INVENTION

1. Field of the Invention

The present invention relates to pentosans and, more particularly, to a process for isolating pentosans from wheat bran.

2. Description of the Prior Art

Pentosans are of great interest in the baking industry due to the beneficial effect which they have on dough properties. Due to their hydrophilic nature, the addition of pentosans during baking increases loaf volume and water absorption and reduces mixing time. In addition, inasmuch as solutions of pentosans are highly viscous, they are widely utilized in the food industry as gums. Pentosans are also used in pharmaceutical preparations, cosmetics, paper and wallboard, as well as in the manufacture of furfural, D-xylose, printing ink and textile sizes.

Wheat bran contains a substantial percentage, i.e., generally greater than about twenty percent, pentosans. Presently, there exists no commercial method for isolation of wheat pentosans either from whole wheat, wheat flour or bran. Laboratory methods for extraction are only applicable for isolating water soluble flour pentosans. Attempts to isolate pentosans from bran by extraction with various percentages of alkali solutions at room and elevated temperatures have met with very limited success in the laboratory and no success whatsoever commercially. Specifically, it was found that if the extractions are carried out at room temperature in alkali solutions, the yields are very poor. At elevated temperatures, the yields are improved but degradation of the pentosans is observed.

SUMMARY OF THE INVENTION

It is, therefore, an object of the present invention to provide a commercially realistic process for isolating pentosans from wheat bran.

It is another object of the invention to provide such a process according to which alkali extraction is enhanced by freezing delignified bran in alkali solution.

Other objects and advantages will appear from the following description and appended claims.

Briefly stated, in accordance with the aforesaid objects, the present invention provides a process for isolating pentosans from wheat bran comprising contacting the bran with water to extract water soluble matter therefrom, delignifying the bran, combining the delignified bran with sufficient aqueous alkali to form a bran-alkali solution having a pH in the range from 9–14, freezing the bran-alkali solution, thawing the solution, separating the pentosan containing alkali fraction and precipitating the pentosans in the alkali fraction. Alkali which are particularly useful as extractants include sodium hydroxide, potassium hydroxide, sodium carbonate and calcium hydroxide.

DETAILED DESCRIPTION OF THE INVENTION

Bran, the seed coat of wheat, constitutes approximately 14½ percent by weight of the wheat kernal. Typically, bran has the following composition:

| | |
|---|---|
| Protein | 19% |
| Pentosans | 21–26.1% |
| Fat | 8.9% |
| Ash | 5.5% |
| Fiber | 5.2–6.0% |
| Cellulose | 45.2%. |

It has been found, according to the present process, that at least a major proportion of the pentosans in the bran can be isolated and recovered in a commercially attractive manner. Unlike the heretofore suggested, cumbersome laboratory procedures which involved numerous bran pretreatments to extract the lipids, pectins and lignins individually and three separate alkali extractions, the present process teaches that pentosan yields resulting from alkali extraction can be substantially enhanced, in excess of 300–400 percent, by single-step pretreatment and by freezing the alkali extractant-bran solution. It is believed that freezing achieves swelling of the bran which has been found to be essential for good extraction. Moreover, a freezing technique preserves the pentosans, thereby avoiding degradation and its attendant loss of viscosity and other commercially important pentosan characteristics.

Prior to actual alkaline extraction of the pentosans, it has been found desirable to remove water soluble matter from and to delignify the bran. If not removed, these substances will interfere with the efficiency of the pentosan extraction and reduce yields. Particularly significant is the need for delignification. Lignin in bran poses a substantial problem to the removal and purification of pentosans. It is known that lignin retards or prevents the complete solublization of hemicelluloses, although it remains unknown whether the effect of lignin is attributable to mechanical obstruction or to yet unidentified covalent bonding. Furthermore, lignin is partially soluble in the various alkali solutions used for dissolving hemicelluloses and, consequently, poses a problem for ultimate isolation of pentosans.

The simplest method for separating the water solubles from the bran is to immerse the bran in warm to hot water for a period of time sufficient to effect complete removal. Using a water bath having a temperature in the range from about 80° up to 100°C, essentially all water solubles will be removed in about 1 hour, although longer periods of water bath immersion will insure complete removal without adversely affecting the bran. For efficient mixing and washing the bran to water ratio, by weight, should be no less than 1:4. Depending on convenience, the water dilution can be increased without limit, from this proportion upward.

The hot water washed bran is preferably air-dried prior to delignification. Unlike the heretofore, suggested, burdensome multi-step lignin, lipid and pectin removal treatments of the prior art, the present process proposes a single step extraction to accomplish the same end. The preferred method contemplates refluxing the bran in an ethanol-strong base solution to wash out the lignins, pectins and lipids. Suitable strong bases include sodium hydroxide and potassium hydroxide. A particularly effective refluxing solution comprises a fifty percent by weight ethanol solution containing one percent by weight sodium or potassium hydroxide. It will be appreciated, however, that the solution can range in concentrations up to 95 percent by weight ethanol containing 15 percent by weight strong base. Following extraction of lignin, pectin and lipids in an ethanol-strong base solution, the refluxed product is washed with water to remove the resulting dark extract prior to alkaline extraction of the pentosans.

Alternatively, delignification can be accomplished using an aqueous acetic acid - sodium chlorite solution. In a typical delignification using these reactants, a 5-gram sample of ground bran is heated for one hour in a hood with 160 ml. of water, 10 drops of glacial acetic acid and 1.5 grams of sodium chlorie. Successive additions of 10 drops of acetic acid and 1.5 grams of sodium chlorite are made at hourly intervals until the reaction has proceeded for about 4 hours, whereupon the almost white residue is filtered, washed and dried.

Still another suitable method for delignification utilizes aqueous acetic acid - sodium hypochlorite solutions. In a typical experiment, a 5 gram sample of ground bran is heated in a hood with 80 ml. of distilled water, 10 drops of glacial acetic acid and 80 ml. of 1–5 percent sodium hypochlorite solution at 90°C for 1 hour. An additional 10 drops of acetic acid and 40 ml. of 1–5 percent sodium hypochlorite solution are added and the solution heated for one more hour at 90°C to yield a light yellow colored residue which is filtered, washed and dried.

However, irrespective of the technique used, the delignified bran should be free of all residue and extracts prior to actual extraction of the pentosans. Therefore, it is good practice to wash the bran with water until is is clearly free of the delignification reaction products. The pentosans are next extracted from the bran by alkaline extraction using dilute alkali solutions having strengths in the range from about 2–15 percent by weight. Extracting solutions which contain less than about 2 percent alkali are too dilute whereas solutions containing in excess of 15 percent alkali are unnecessary and uneconomical. Preferred solution concentrations are in the range of about 4 to 10 percent alkali. Extraction with sodium hydroxide is particularly preferred although satisfactory results have been observed with potassium hydroxide. Calcium hydroxide, sodium carbonate and mixtures of the foregoing are also suitable extractants.

The delignified bran is first combined with sufficient of the alkali extracting solution to create an alkaline environment, as evidenced by a bran-slkali solution pH in the range 9 to 14 and preferably 12 to 14. Next, the solution is frozen using any known technique, such as freezing in a conventional box-type freezer. It is most important that the bran and alkali solution are totally frozen together since it is believed that the alkali solution enters the swollen bran cells to accomplish maximum extraction. If the bran cells are not frozen, the extraction is minimal. Thus, the time of freezing is unimportant so long as total freezing is accomplished. As a practical matter, it is suggested that the bran-alkali solution be frozen to a solid mass as a means of insuring that total freezing has been accomplished. Nothing appears to be gained by prolonged freezing although no harm is done thereby. Accordingly, the freezing time is merely a matter of convenience having no influence whatever on the efficiency or extent of pentosan isolation.

Following freezing, the bran-alkali solution is thawed and the pentosan-containing alkali extract fraction is separated from the solid residue which has formed. Separation is most easily accomplished by centrifugation. However, filtration using suction techniques through a coarse sintered filter disc will work satisfactorily. Alternatively, filtration through a cloth may advantageously precede filtration through the sintered disc.

To recover the pentosans from the alkaline extract, any suitable technique which will not degrade the pentosans can be used. One effective procedure is to neutralize the extract to pH 6.5–7.5, preferably 7.0, with a mild acid such as acetic acid or dilute hydrochlorc acid, to yield a precipitate which is filtered and then discarded. The filtrate is concentrated, preferably under reduced pressure at about 30°C, to about one-tenth its original volume. An equal volume of acetone, ethanol or 2-propanol is then added to the concentrated extract to precipitate the pentosans, after which the precipitate is separated by centrifugation or filtration and is washed with acetone, ethanol, 2-propanol or mixtures thereof.

The purpose of the filtrate concentration step is to reduce the volume of the filtrate so that lesser volumes of precipitant can be utilized. Inasmuch as equal volumes of precipitant need be added to the filtrate to achieve maximum precipitation of pentosans, if the filtrate volume is large, the cost of the process is substantially increased. There is nothing critical about concentrating the filtrate to one-tenth of its original volume. However, if the filtrate is concentrated more than tenfold, there can be degradation in the pentosans. Concentration to less than one-tenth volume requires more precipitant and is, therefore, uneconomical. Reduced pressure and lower temperature are always desirable during concentration of the filtrate to prevent degradation in the pentosans and to avoid side reactions which might occur under atmospheric pressure and elevated temperatures.

To illustrate the superiority of the present process and the improvement therein over precedures heretofore suggested for pentosan isolation, the following comparative examples of the prior art and the instant process are presented:

EXAMPLE I

Prior techniques of isolating pentosans taught alcohol-benzene extraction of lipids, ammonium oxalate treatment to extract pectins, water bath extractions to remove water solubles and numerous room temperature alkaline extractions to isolate pentosans.

For example, 50 g. of wheat bran was extracted exhaustively with 250 ml. of benzene-alcohol (proportion of 2:1 by weight) followed by 200 ml. ethanol to remove pigments, lipids and waxy substances. Water soluble materials were removed by two four-hour extractions in water baths at 85°C. Pectic substances were extracted by ammonium oxalate (0.5 percent by weight) at 85°C, in two 3-hour extraction periods. The residue was thoroughly washed with warm water and dried with ethanol and ether.

The above bran (16 g.) was extracted with stirring for 20 hours at room temperature with 800 g. of 4 percent sodium hydroxide in an atmosphere of nitrogen (pH of bran-alkali solution in excess of 12.0). After recovery by filtration on cloth, the residue was subjected to a further sodium hydroxide extraction for 48 hours. The combined alkaline filtrates were brought to pH 7.0 with acetic acid and then concentrated under reduced pressure at 30°C to one-tenth their original volume. An equal volume of acetone was added to the concentrate to precipitate pentosans. The precipitate was centrifuged and washed twice with acetone and then once with ethanol.

The percent pentosans in the bran at various stages in the process was determined by the procedure set forth in Methods of Analysis of the Association of Official Agricultural Chemists, Sections 22.050–22.051, pg. 336, (1965).
Analysis:

| | | |
|---|---|---|
| a. | % Pentosans in bran (starting material) | 22.7 |
| b. | % Pentosans in bran (after extracting out lipids, water solubles and pectins) | 42.7 |
| c. | % Pentosans in bran (after alkali extraction for pentosans) | 37.9 |
| d. | % Pentosans in precipitate (crude pentosans) | 20.7. |

The results from analysis (b) and (c) show that very little of the pentosans in bran can be extracted by the above exhaustive alkali extraction at room temperature.

EXAMPLE II

The technique of Example I was modified to include a single step lignin, pectin and lipid removal.

One hundred grams of bran was heated in 1 liter of water for 1 hour at 85°C to extract the water soluble material. The hot water washed bran was air-dried.

The above, air-dried bran (75 g.) was refluxed with 50 percent ethanol containing 1 percent sodium hydroxide. The refluxed product was washed two times with water until the dark extract was washed out. Then the residual bran was mixed with 500 g. of 5 percent aqueous sodium hydroxide solution (pH of resulting solution greater than 12.0) and stirred at room temperature for 25 hours. After recovery of the alkaline extract by filtration, the filtrate was neutralized to pH 7.0 with acetic acid. The precipitate obtained after neutralization was filtered, and the filtrate was concentrated under reduced pressure at 30°C to one-tenth of original volume. An equal volume of acetone was added to the concentrated extract and the resulting precipitate was centrifuged. The precipitate was washed with acetone and then finally with ethanol. Pentosan analysis was accomplished by the procedure set forth in Example I.
Analysis:

| | | |
|---|---|---|
| a. | % Pentosans in bran (starting material) | 22.7 |
| b. | % Pentosans in bran (after hot water wash) | 41.6 |
| c. | % Pentosans in bran (after alkali extraction) | 35.7 |
| d. | % Pentosans in precipitate (crude pentosans) | 23.1 |

The results from analysis (b) and (c) again show little extraction of pentosans by alkali extraction at room temperature.

EXAMPLE III

The process of the present invention was practiced to isolate pentosans from wheat bran.

One hundred grams of bran was heated in 1 liter of water at 85°C for 1 hour to extract water soluble material. The hot water washed bran was air-dried.

The above air-dried bran (75 g.) was reflued with 250 ml. of 50 percent ethanol containing 1 percent sodium hydroxide. The refluxed product was washed two times with water until the dark extract was washed out. Then the residual bran was mixed with 500 g. of 5 percent aqueous sodium hydroxide solution (pH of resulting solution greater than 12.0) and was frozen overnight. The mixture was then thawed and the alkali extract was separated by centrifugation. The alkali extract was neutralized with acetic acid to pH 7.0. The precipitate obtained after neutralization was filtered, and the filtrate was concentrated under reduced pressure at 30°C to one-tenth of the original volume. An equal volume of acetone was added to the concentrated extract and the precipitate obtained was centrifuged. The precipitate was washed first with acetone and then with ethanol. Pentosan analysis was accomplished by the procedure set forth in Example I.
Analysis:

The crude pentosans were a fluffy gray powder.

| | | |
|---|---|---|
| a. | % Pentosans in bran (starting material) | 22.7 |
| b. | % Pentosans in bran (after hot water washing) | 42.4 |
| c. | % Pentosans in bran (after alkali extraction by freezing technique) | 19.1 |
| d. | % Pensotans in precipitate (crude pentosans) | 44.1. |

The results from analysis (b) and (c) show that more than half of the pentosans were extracted by the present freezing technique.

EXAMPLE IV

The process of Example III was modified to use sodium carbonate in lieu of sodium hydroxide as the extractant.

100 grams of hot water washed bran was delignified with 50 percent ethanol containing 1 percent sodium hydroxide as set forth in Example III. The delignified bran was mixed with 500 ml. of 5 percent sodium carbonate solution (aqueous) (pH of resulting solution greater than 12) and was frozen overnight. The mixture was then thawed and the alkali extract was separated by centrifugation. The alkali extract was neutralized to pH 7.0 with acetic acid. The precipitate obtained after neutralization was filtered and the filtrate was concentrated under reduced pressure at 30°C to one-tenth of its original volume. An equal volume of acetone was added to the concentrated extract and the precipitate was centrifuged. The precipitate was washed first with acetone and then with ethanol. The pentosans isolated were air-dried. Pentosan analysis was accomplished by the procedure set forth in Example I.
Analysis:

| | | |
|---|---|---|
| a. | % Pentosans in bran (starting material) | 22.7 |
| b. | % Pentosans in bran (after hot water wash) | 42.7 |
| c. | % Pentosans in bran (after sodium carbonate extracction by freezing technique) | 29.7 |
| d. | % Pentosans in crude precipitate | 28.9. |

While the isolation of pentosans with sodium carbonate was not found to be as efficient as with sodium hydroxide, it was substantially more effective than any other known technique.

EXAMPLE V

The following example illustrates the need for delignification prior to alkali extraction.

One hundred grams of wheat bran was extracted with 1000 g. of distilled water heated at 90°C for one-hour to extract water soluble material. After water extraction the bran was air-dried.

The above air-dried bran was mixed at room temperature with 1000 g. of 5 percent sodium hydroxide and frozen overnight (pH of resulting solution greater than 12.0). The mixture was then thawed and the alkali extract was separated by centrifugation. The alkali extract was neutralized with acetic acid to pH 7.0. The precipitate obtained after neutralization was filtered, and the filtrate was concentrated under reduced pressure at 30°C to one-tenth of the original volume. An equal volume of acetone was added to the concentrated extract and the precipitate obtained was centrifuged. The precipitate was washed first with acetone and then with ethanol. Pentosan analysis was accomplished by the procedure set forth in Example I.

Analysis:

The crude pentosans isolated were a brown colored product, rather than the usual fluffy gray powder.

| a. | % Pentosans in bran (starting material) | 22.7 |
|---|---|---|
| b. | % Pentosans in bran (after water extraction) | 42.7 |
| c. | % Pentosans in bran (after alkali extraction) | 38.6 |
| d. | % Pentosans in crude precipitate | 7.9. |

The results from analysis (b) and (c) show that without delignification the isolation of pentosans by alkali extraction is very low and the product obtained is dark brown in color. The reason for this color is that lignin is extracted with the pentosans by the alkali solution making isolation and purification of the pentosans difficult.

If desired, delignified bran may be treated prior to alkali extraction to aid swelling in the alkali solution upon freezing. According to one technique, swelling can be assisted by treating the delignified bran with anhydrous ammonia followed by extraction in an alkaline medium, as hereinbefore set forth. The following example illustrates the present process, including the additional step of treating the delignified bran with anhydrous ammonia prior to alkaline extraction.

EXAMPLE VI

Air-dried delignfied bran (150 g.) was placed in a 3-liter, round bottomed flask fitted with a ground glass cap and a side arm with a stop cock. Moisture was removed by continuous evacuation to 0.1 mm. pressure for 3 hours over phosphorus pentoxide at room temperature. The flask was placed in a suitable box insulated with glass wool and connected through the side arm to a cylinder of liquid ammonia. A slow flow of liquid ammonia was started and was sucked into the evacuated flask by slowly opening the stop cock in the side arm thereby allowing gaseous ammonia to escape. When the pressure inside the flask reached atmospheric, the ground glass cap was removed and the flow of liquid ammonia was increased. Approximately 1500 ml. of liquid ammonia was used for 150 g. of bran. The reaction flask was then removed from the insulated box and allowed to stand at room temperature for 36 hours. No mechanical agitation was necessary as the boiling of ammonia solution provided adequate mixing. Formation of a heavy coating of frost on the outside of the flask greatly retarded ammonia evaporation and permitted the treatment to proceed actively for 24–36 hours, without further attention. At the end of the reaction period, the liquid ammonia was pumped off as a gas through anhydrous calcium chloride by a water aspirator.

The ammonia treated bran was mixed with 5 percent sodium hydroxide (aqueous) (pH of resulting solution greater than 12.0) and was frozen overnight. The mixture was then thawed and the alkali extract was separated by centrifugation. The alkali extract was neutralized with acetic acid to pH 7.0. The precipitate obtained after neutralization was filtered, and the filtrate was concentrated under reduced pressure at 30°C to one-tenth of the original volume. An equal volume of acetone was added to the concentrated extract and the precipitate obtained was centrifuged. The precipitate was washed first with acetone and then with ethanol. Pentosan analysis was accomplished by the procedure set forth in Example I.

Analysis:

| a. | % Pentosans in bran (starting material) | 22.7 |
|---|---|---|
| b. | % Pentosans in bran (after hot water wash) | 42.1 |
| c. | % Pentosans in bran (after ammonia treatment and alkaline extraction by freezing) | 20.2 |
| d. | % Pentosans in the crude pentosans | 42.9. |

In lieu of treating the delignified bran with anhydrous ammonia, the bran may be subjected to short preliminary hydrolysis prior to alkaline extraction of the pentosans. The pre-hydrolysis partially hydrolyzes the bond between the pentosans and other components such as lignins, so that the pentosans are more vulnerable to extraction. For example, 100 g. of delignified bran was refluxed with 250 ml. of 2.5 N sulfuric acid at 100°C for 5 minutes. The acid was filtered and the bran was washed free of acid and air-dried. The pre-hydrolyzed air-dried bran was mixed with 5 percent sodium hydroxide and was frozen overnight. The mixture was then thawed and the alkali extract was processed as explained in Example III hereof.

It was noted that the pre-hydrolysis resulted in greater yields of pentosans, but that the product isolated was decomposed and brown in color, indicating side reactions in the pentosan moieties as a result of the pre-hydrolysis. However, under carefully controlled conditions, pre-hydrolysis can be a valuable aid in isolating pentosans without adversely affecting them.

The precipitated crude pentosans recovered as a result of freezing the alkali solution, neutralizing the alkali extracts and precipitating the pentosans may be purified, if desired, to enhance the percentage pentosans in the solid residue. It has been found that copper salts form a complex with the pentosans with the result that other contaminants, like cellulose and proteinaceous material are left in the solution, yielding a clear fractionation between the precipitated pentosan-copper complex and the impurities in the solution. Decomposition of the pentosan-copper complex with acid followed by precipitation of pentosans with ethanol or acetone yields increased percentages of pentosans in the precipitate.

The following example illustrates the isolation and purification of crude pentosans.

EXAMPLE VII

Isolation of Crude Pentosans

Two hundred grams of bran was heated in 2 liters of water at 85°C for 1 hour to extract water soluble material. The hot water washed bran was air-dried.

The above air-dried bran (150 g.) was refluxed with 400 ml. of 50 percent ethanol containing 1 percent sodium hydroxide. The refluxed product was washed with water until the dark extract was washed out. Then the residual bran was mixed with 1 liter of 5 percent aqueous sodium hydroxide solution (pH of resulting solution greater than 12.0) and was frozen. The mixture was then thawed and the alkali extract was separated by centrifugation. The alkali extract was neutralized to pH 7.0 with acetic acid. The precipitate obtained after neutralization was filtered and the filtrate was concentrated under reduced pressure at 30°C to one-tenth of its original volume. An equal volume of acetone was added to the concentrated extract and the precipitate was centrifuged. The precipitate was washed first with acetone and then with ethanol. The precipitated crude pentosans were air-dried.

Purification of Crude Pentosans

The crude pentosans (20 g.) were dissolved with shaking in 4 percent sodium hydroxide (500 ml.) and to this solution 500 ml. of Fehlings solution was added with stirring. The precipitated copper complexed-pentosans were decomposed with dilute hydrochloric acid and the pentosans were precipitated by addition of an equal volume of ethanol. The precipitate was washed free of excess cupric chloride with acetone and then dried. Pentosan analysis was accomplished by the procedure set forth in Example I.

Analysis:

| | | |
|---|---|---|
| a. | % Pentosans in bran (starting material) | 22.7 |
| b. | % Pentosans in bran (after hot water wash) | 42.7 |
| c. | % Pentosans in bran (after alkali extraction by freezing technique) | 15.7 |
| d. | % Pentosans in precipitate (crude pentosans) | 45.2 |
| e. | % Pentosans in purified precipitate (copper complexing) | 70.1 |

The results from analysis (b) and (c) show that significantly more than half of the pentosans were extracted by the present freezing technique. Analysis (d) and (e) confirm that copper complexing can purify the isolated crude pentosans to about 70 percent pentosans.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. A method of isolating pentosan from wheat bran comprising the steps of:
   a. immersing the bran in water having a temperature in the range from about 80° to 100° C. and wherein the proportion by weight of bran to water is not less than 1:4 to extract water soluble matter from the bran;
   b. delignifying the bran;
   c. combining the delignified bran with sufficient aqueous alkali selected from the group consisting of sodium hydroxide potassium hydroxide, sodium carbonate, calcium hydroxide and mixtures thereof to form a bran-alkali solution having a pH in the range from 9 to 14;
   d. freezing the bran-alkali solution;
   e. thawing the solution to form an alkali fraction and a solid fraction;
   f. separating the pentosan containing alkali fraction from the solid fraction; and
   g. separating the pentosans from the alkali fraction.

2. A method, as claimed in claim 1, wherein the step of delignifying the bran comprises refluxing the bran in an aqueous solution of ethanol containing a minor proportion by weight of an alkali selected from the group consisting of sodium and potassium hydroxide.

3. A method, as claimed in claim 2, wherein the ethanol-alkali solution comprises 50 percent by weight ethanol containing 1 percent by weight of sodium hydroxide.

4. A method, as claimed in claim 1, wherein said aqueous alkali solution comprises from about 2 to 15 percent by weight of alkali in water.

5. A method, as claimed in claim 4, wherein said alkali solution comprises from about 4 to 10 percent by weight of alkali in water.

6. A method, as claimed in claim 1, wherein the pH of the bran-alkali solution is in the range from 12 to 14.

7. A process, as claimed in claim 1, wherein said aqueous alkali solution comprises from about 4 to 10 percent by weight of alkali and water and said pH is in the range from 12 to 14.

8. A method, as claimed in claim 7, wherein said alkali is sodium hydroxide.

9. A method, as claimed in claim 1, wherein said bran-alkali solution is frozen to a solid mass.

10. A method, as claimed in claim 1, wherein the step of separating the pentosan containing alkali fraction comprises centrifuging said thawed bran-alkali solution.

11. A method, as claimed in claim 1, wherein the step of separating the pentosans from the alkali fraction comprises:
   a. neutralizing said fraction with mild acid to pH in the range 6.5–7.5 to form a precipitate;
   b. filtering the precipitate;
   c. reducing the volume of the filtrate; and
   d. adding an amount of a precipitant selected from the group consisting of acetone, ethanol, 2propanol and mixtures thereof at least equal to the reduced volume of the filtrate to precipitate the pentosans.

12. A method, as claimed in claim 11, wherein the filtrate volume is reduced by concentrating said filtrate under reduced pressure.

13. A method, as claimed in claim 1, including the additional step of hydrolyzing the delignified bran with an acid prior to alkaline extraction.

14. A method, as claimed in claim 13, wherein said acid is sulfuric acid.

15. A method, as claimed in claim 1, including the additional step of purifying the isolated pentosans by dissolving said isolated pentosans in mild alkali, treating said pentosans with a copper salt to precipitate the pentosans, decomposing the precipitate with an acid and precipitating the pentosans with a precipitant selected from the group consisting of acetone and ethanol.

16. A method, as claimed in claim 15, wherein the copper salt is Fehling's solution.

17. In a method for isolating pentosans from wheat bran including the steps of extracting water soluble matter from the bran, delignifying the bran, forming a bran-aqueous alkali solution to extract the pentosans from the bran and separating the pentosans from the resulting alkali extraction fraction, the improvement comprising freezing and thawing the bran-alkali solution prior to separating the pentosans from the alkali extraction fraction.

18. A method of isolating pentosans from wheat bran comprising the steps of:
   a. immersing the bran in a water bath having a temperature in the range of 80° to 100°C and wherein the proportion by weight of bran to water is not less than 1:4 to extract water-soluble matter from the bran;
   b. refluxing the bran in an aqueous solution of ethanol containing a minor proportion by weight of alkali selected from the group consisting of sodium and potassium hydroxide to delignify the bran;
   c. combining the delignified bran with an amount of aqueous alkali having a concentration by weight in the range from about 4 to 10 percent alkali in water sufficient to form a bran-alkali solution having a pH in the range from 12 to 14, said alkali selected from the group consisting of sodium hydroxide, potassium hydroxide, sodium carbonate, calcium hydroxide mixtures thereof;
   d. freezing the bran-alkali solution to a solid mass;
   e. thawing the solution to form an alkali fraction and a solid fraction;
   f. centrifuging the thawed bran-alkali solution to separate the pentosan containing alkali fraction from the solid fraction;
   g. neutralizing said alkali fraction with mild acid to a pH in the range 6.5 to 7.5 to form a precipitate;
   h. filtering the precipitate;
   i. reducing the volume of the filtrate by concentrating same under reduced pressure;
   j. adding an amount of a precipitant selected from the group consisting of acetone, ethanol, 2-propanol and mixtures thereof at least equal to the reduced volume of the filtrate to precipitate the pentosans; and
   k. washing the pentosan precipitate with a precipitant selected from the group consisting of acetone, ethanol, 2-propanol and mixtures thereof.

19. A method as claimed in claim 18, including the additional step of purifying the isolated pentosans by dissolving said pentosans in dilute alkali, treating said resulting solution with Fehling's solution to precipitate the pentosans, decomposing the pentosan precipitate with mild acid, and precipitating the pentosans from the acid solution by addition thereto of an approximately equal volume of a precipitant selected from the group consisting of acetone and ethanol.

* * * * *